(12) United States Patent
Xu et al.

(10) Patent No.: US 11,864,573 B1
(45) Date of Patent: Jan. 9, 2024

(54) MEAT PRESERVATION APPARATUS AND METHOD ALLOWED TO BROADEN ICE TEMPERATURE

(71) Applicant: Hefei University of Technology, Hefei (CN)

(72) Inventors: Baocai Xu, Hefei (CN); Zhaoming Wang, Hefei (CN); Hui Zhou, Hefei (CN); Kezhou Cai, Hefei (CN); Yuanbo Hu, Hefei (CN); Yunhao Ma, Hefei (CN); Wei Cui, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 18/237,942

(22) Filed: Aug. 25, 2023

(30) Foreign Application Priority Data

Aug. 29, 2022 (CN) .......................... 202211036719.1

(51) Int. Cl.
*A23L 3/36* (2006.01)
*A23L 3/32* (2006.01)
*A23L 3/30* (2006.01)
*F25D 3/11* (2006.01)
*F25D 13/06* (2006.01)
(Continued)

(52) U.S. Cl.
CPC ................. *A23L 3/362* (2013.01); *A23L 3/30* (2013.01); *A23L 3/32* (2013.01); *F25D 3/11* (2013.01); *F25D 3/127* (2013.01); *F25D 13/06* (2013.01); *F25D 25/04* (2013.01)

(58) Field of Classification Search
CPC ... A23L 3/362; A23L 3/30; A23L 3/32; F25D 3/11; F25D 3/127; F25D 13/06; F25D 25/04
See application file for complete search history.

(56) References Cited

U.S. PATENT DOCUMENTS 3,488,976 A * 1/1970 Betschart ................. A23G 9/22
62/73
6,009,719 A * 1/2000 Ochs ......................... F25D 3/11
62/380

(Continued)

FOREIGN PATENT DOCUMENTS

| EP | 0580466 A1 * | 1/1994 | ............ A23L 3/361 |
| EP | 2269474 A2 * | 1/2011 | ............... A23L 3/30 |
| EP | 2550873 A1 * | 1/2013 | ............ A23L 23/00 |

*Primary Examiner* — Joseph F Trpisovsky
(74) *Attorney, Agent, or Firm* — Bayramoglu Law Offices LLC

(57) ABSTRACT

A meat preservation apparatus and method allowed to broaden the ice temperature are provided. The second conveyor mesh belt is equipped with an ice temperature device, the right end of the second conveyor mesh belt is equipped with an ice temperature device, the ice temperature device comprises a base, a spinning disk is arranged above the base, and four moving plates that can move inside and outside are evenly arranged above the spinning disk, two first linear actuators are vertically arranged above each moving plate, an ice temperature box can move up and down between the two first linear actuators, conveyor belts are arranged in the ice temperature box, and the conveyor belts are driven by the first motor, a box door is set on an outside of the ice temperature box, and the box door is driven by a second motor.

17 Claims, 4 Drawing Sheets

(51) Int. Cl.
  *F25D 3/12* (2006.01)
  *F25D 25/04* (2006.01)

(56) References Cited

U.S. PATENT DOCUMENTS

2006/0070393 A1* 4/2006 Muscato .................. A23L 3/362
  62/62
2019/0142037 A1* 5/2019 Bowden .................... A23L 2/50
  422/22

* cited by examiner

MEAT PRESERVATION APPARATUS AND METHOD ALLOWED TO BROADEN ICE TEMPERATURE

CROSS REFERENCE TO THE RELATED APPLICATIONS

This application is based upon and claims priority to Chinese Patent Application No. 202211036719.1, filed on Aug. 29, 2022, the entire contents of which are incorporated herein by reference.

TECHNICAL FIELD

The invention relates to the technical field of preservation apparatus, in particular to a meat preservation apparatus and method allowed to broaden an ice temperature.

BACKGROUND

Studies have shown that meat has its corresponding ice temperature, and meat can maintain the color, flavor, and freshness of the ingredients when it is preserved in the ice temperature. However, the ice temperature of the meat is very narrow, and the temperature of the current refrigeration system fluctuates greatly, so it is very difficult to preserve meat under ice temperature conditions.

In addition, at present, the preservation process of meat often requires a transfer in and a transfer out manually, which is time-consuming and laborious, it is difficult to cooperate with the continuous production of the meat production line, which will lead to low efficiency of the meat production line. Therefore, a high degree of automation preservation apparatus allowed to broaden an ice temperature is required.

SUMMARY

The content of the invention is to provide a meat preservation apparatus and method allowed to broaden the ice temperature, which can overcome some defects of the existing technology.

According to the invention, a meat preservation apparatus allowed to broaden an ice temperature comprises an impregnation device, the impregnation device comprises a first conveyor mesh belt, the first conveyor mesh belt is vertically equipped with baffles, the first conveyor mesh belt comprises a feed section, a downhill section, an impregnation section, an uphill section and a discharge section, the impregnation section is located in an impregnation tank and a water level of the impregnation tank is lower than a height of the baffles;

a right end of the discharge section is equipped with a second conveyor mesh belt, and a water collecting tank is arranged below the second conveyor mesh belt;

a right end of the second conveyor mesh belt is equipped with an ice temperature device, the ice temperature device comprises a base, a spinning disk is arranged above the base, and four moving plates that can move inside and outside are evenly arranged above the spinning disk, two first linear actuators are vertically arranged above each moving plate, an ice temperature box can move up and down between the two first linear actuators, conveyor belts are arranged in the ice temperature box, and the conveyor belts are driven by a first motor, a box door is set on an outside of the ice temperature box, the box door is driven by a second motor; the ice temperature box is equipped with an ultrasonic generator and an electrostatic plate;

a number of ice temperature boxes is 4, when a first ice temperature box corresponds to the second conveyor mesh belt, a second ice temperature box corresponds to the cleaning nozzle, a third ice temperature box corresponds to the third conveyor mesh belt, and a fourth ice temperature box is used for ice temperature;

a back end of a third conveyor mesh belt corresponds to a bag packaging machine.

Preferably, there is a moving block under the moving plate, and the moving block is connected to a second linear actuator, the second linear actuator is installed inside the spinning disk.

Preferably, the first linear actuator comprises a body, the body is equipped with an installation cavity, the installation cavity is equipped with a screw, the screw is sleeved with a screw nut, the screw nut is connected to a connecting block, one side of the installation cavity is provided with a strip hole, the connecting block is movably stuck in the strip hole, and one end of the connecting block is connected to the ice temperature box; the screw is driven by a third motor, and the third motor is installed on a top of the body, a structure of the second linear actuator is the same as that of the first linear actuator.

Preferably, the first motor is installed on an outer wall of the ice temperature box, and the second motor is installed on a top surface of the ice temperature box.

Preferably, the ice temperature box is cooled by a CO/NH cascade refrigeration system.

Preferably, a cleaning nozzle is installed on a third linear actuator, the third linear actuator enables the cleaning nozzle to move up and down, and there is a water collection tank under the cleaning nozzle.

Preferably, through holes are arranged on the conveyor belts.

Preferably, a bottom of the moving plate is provided with balls, and the bottoms of the balls are attached to a top surface of the spinning disk.

The invention also provides a meat preservation method allowed to broaden an ice temperature, which adopts the above-mentioned meat preservation apparatus allowed to broaden the ice temperature, comprising the following steps:

1. transmitting meat to the impregnation device, and then transmitting meat to the second conveyor mesh belt after meat is immersed in an impregnating solution in the impregnation tank;
2. transmitting meat to the conveyor belt in the first ice temperature box after the meat is drained on the second conveyor mesh belt;
3. when the first group of conveyor belts is full of meat, adjusting heights by the first linear actuator so that the second group of conveyor belts and the second conveyor mesh belt are filled accordingly, proceeding until all conveyor belts are filled with meat;
4. After the conveyor belts are filled with meat, moving the moving plates inward so that the first ice temperature box moves back, that is, moving the second conveyor mesh belt away from the first ice temperature box; and then rotating the spinning disk for an angle of 90° so that the second ice temperature box is corresponded to the second conveyor mesh belt, moving the second ice temperature box outward through the moving plate so that the second conveyor mesh belt is close to the corresponding conveyor belt; closing the door on the first ice temperature box automatically, when the rotation is completed during a rotation of the spinning disk, starting the refrigeration system, ultrasonic generator, and electrostatic plate in the first ice temperature box to work, and carrying out an ice temperature to keep meat fresh.
5. when the meat in the second ice temperature box is filled and the ice temperature of meat in the first ice temperature box is completed, rotating the spinning disk for an angle of 90°, filling the third ice temperature box corresponds to the second conveyor mesh belt and the first ice temperature box corresponds to the third conveyor mesh belt with meat, and performing ice temperature by the second ice temperature box;
6. when all the ice temperature boxes finish the above operation and the ice temperature boxes rotate for an angle of 90°, at this time, performing cleaning operation when the first ice temperature box corresponds to the cleaning nozzle, thus when the ice temperature boxes rotate every time in a 90°, performing operations of meat loading, ice temperature, meat unloading and cleaning in circulation in the ice temperature boxes;
7. transferring meat to the bag packaging machine through the third conveyor mesh belt for packaging, and then transferring the packaged meat to a fresh-keeping warehouse for further preservation.

Preferably, whenever the ice temperature box is going to correspond to the second conveyor mesh belt, adjusting the height of the first linear actuator first so that the top conveyor mesh belt corresponds to the second conveyor mesh belt.

The invention can immerse meat easily and automatically at low temperatures first, and then carry out ice temperature by ultrasonic and electric field, which can effectively broaden the ice temperature and facilitate the preservation of meat; moreover, the invention can perform operations of meat loading, ice temperature, meat unloading and cleaning in circulation in the process of ice temperature, which is very convenient.

DETAILED DESCRIPTION OF THE EMBODIMENTS

In order to further understand the content of the invention, the invention is described in detail in combination with drawings and an embodiment, it should be understood that the embodiment is only an explanation of the invention and not a limitation.

Embodiment

Figure 1:
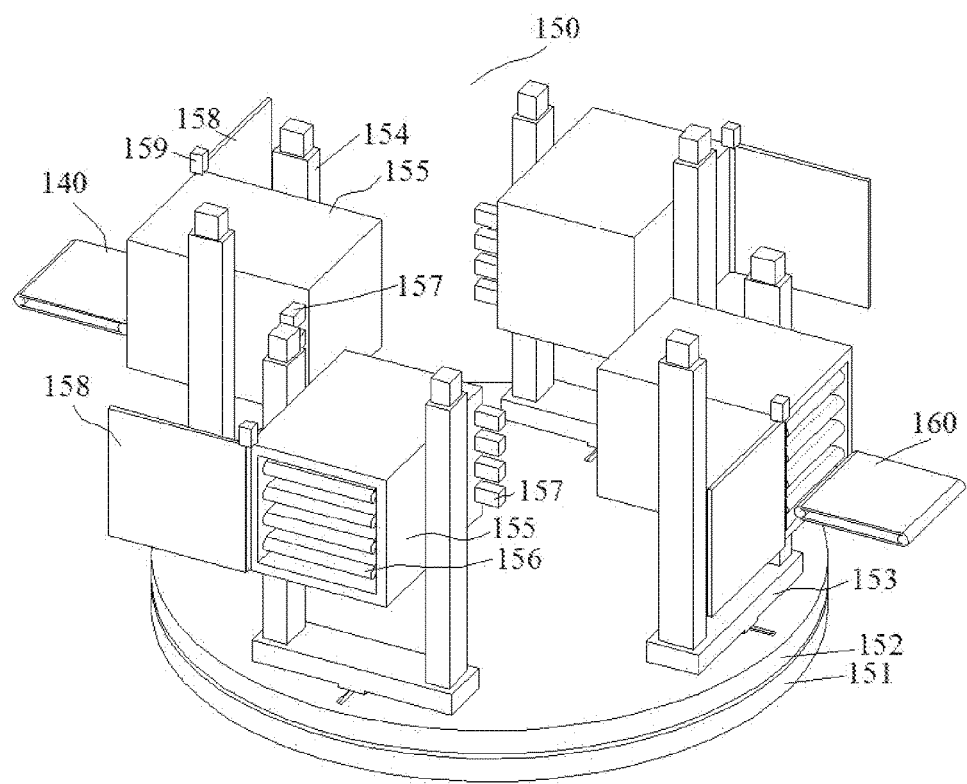
FIG. 1 is a structural diagram of the ice temperature device in the embodiment.
Figure 2:
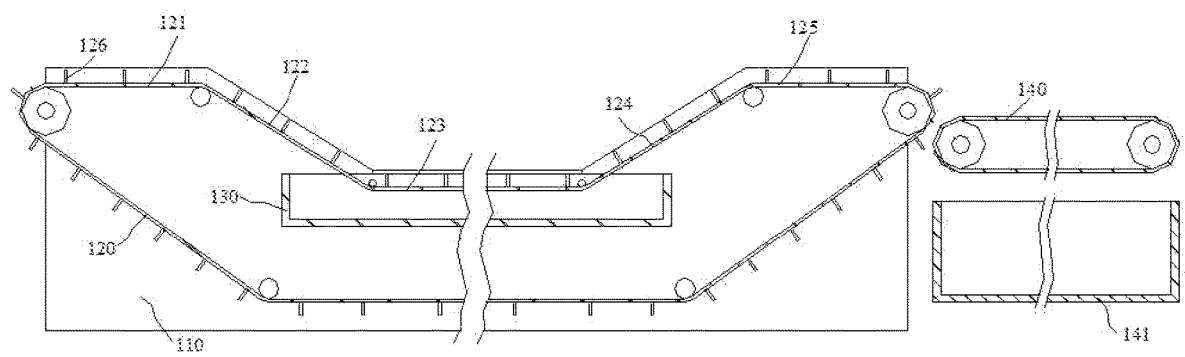
FIG. 2 is a structure diagram of the impregnation device in the embodiment.
Figure 3:
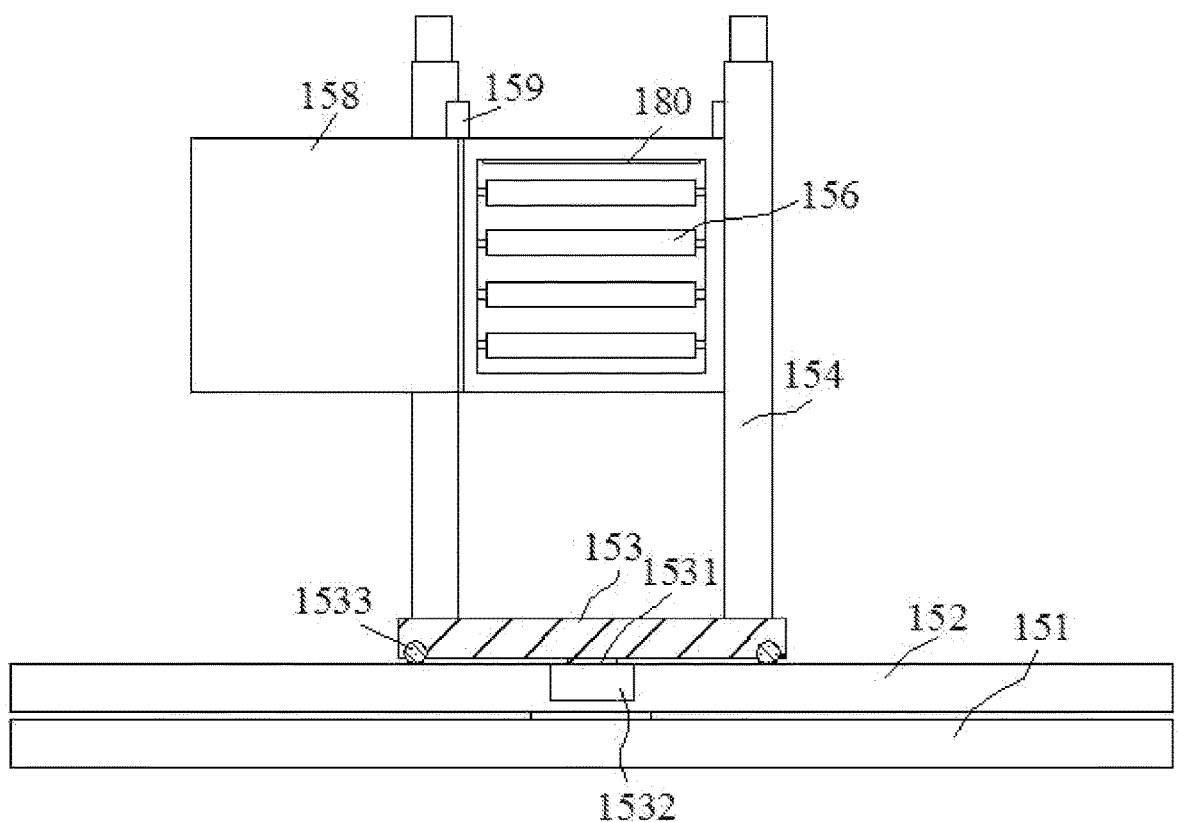
FIG. 3 is a structure diagram of the ice temperature box in the embodiment.
Figure 4:
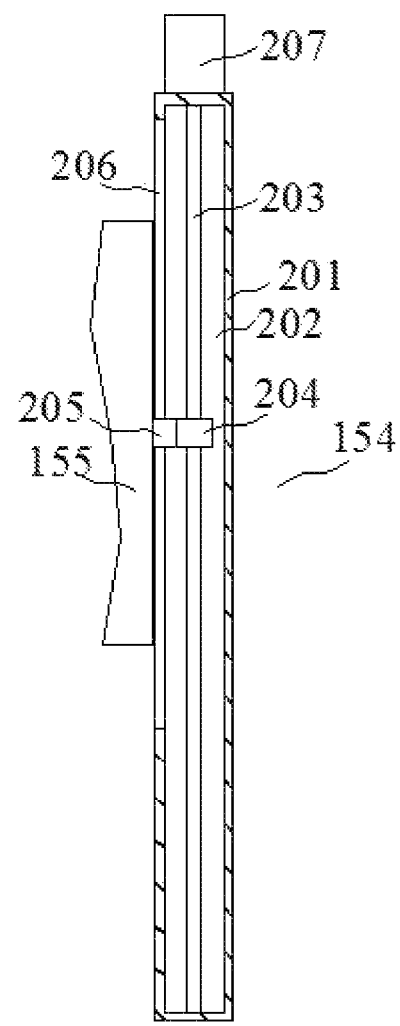
FIG. 4 is a structure diagram of the first linear actuator in the embodiment.
Figure 5:
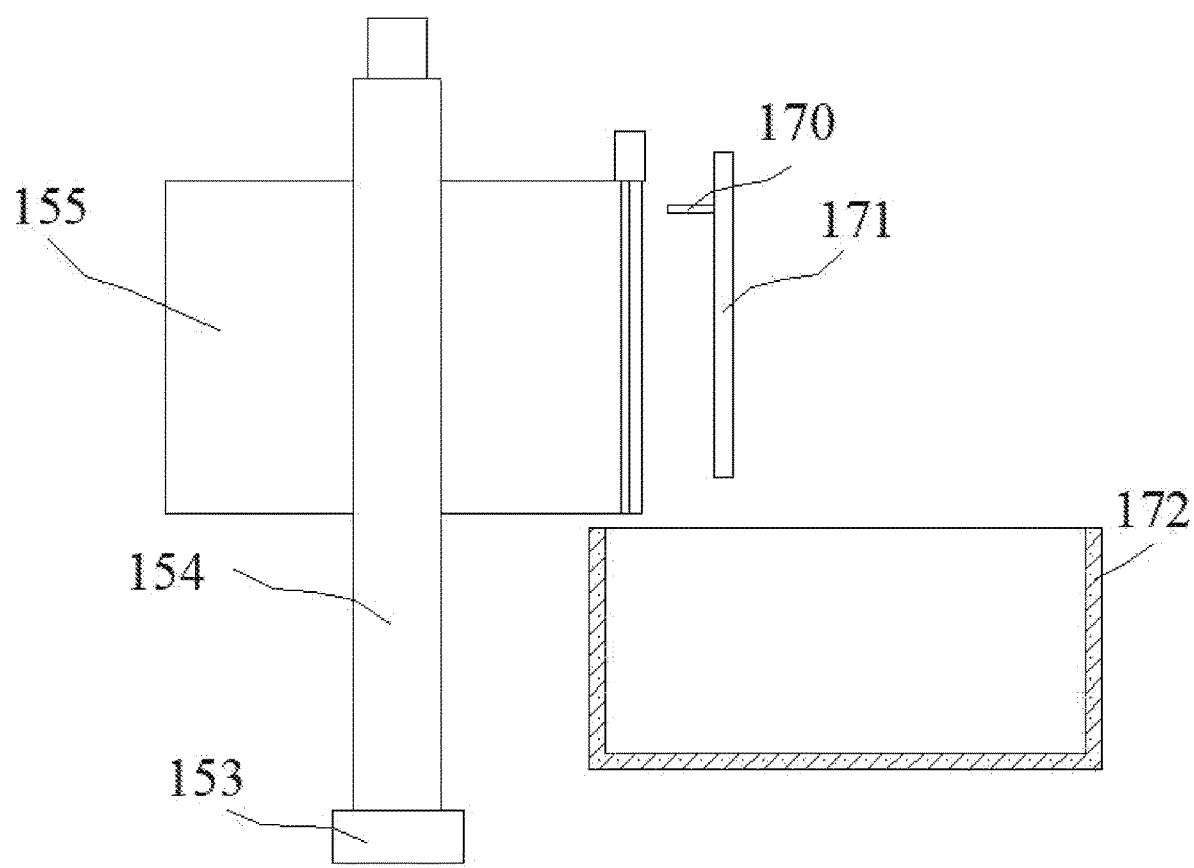
FIG. 5 is a structure diagram of the cleaning nozzle in the embodiment.

As shown in FIGS. 1-5, this Embodiment provides a meat preservation apparatus allowed to broaden the ice temperature, comprising impregnation device 110, impregnation device 110 comprises the first conveyor mesh belt 120, the first conveyor mesh belt 120 is vertically equipped with baffles 126, the first conveyor mesh belt 120 comprises feed section 121, downhill section 122, impregnation section 123, uphill section 124 and discharge section 125, impregnation section 123 is located in impregnation tank 130 and the water level of the impregnation tank 130 is lower than the height of the baffles 126; the left end of feed section 121 and right end of discharge section 125 are respectively equipped with transmission wheels, the lower right end of feed section 121, the lower left end of discharge section 125 and the upper left and right ends of impregnation section 123 are respectively equipped with change wheels;

the right end of discharge section 125 is equipped with the second conveyor mesh belt 140, and water collecting tank 141 is arranged below the second conveyor mesh belt 140;

the right end of the second conveyor mesh belt 140 is equipped with ice temperature device 150, ice temperature device 150 comprises base 151, spinning disk 152 is arranged above base 151, and four moving plates 153 that can move inside and outside are evenly arranged above spinning disk 152, two first linear actuators 154 are vertically arranged above each moving plate 153, ice temperature boxes 155 can move up and down between two first linear actuators 154, conveyor belts 156 are arranged in ice temperature box 155, and conveyor belts 156 are driven by the first motor 157, box door 158 is set on an outside of ice temperature box 155, box door 158 is driven by the second motor 159; ice temperature box 155 is equipped with an ultrasonic generator and electrostatic plate 180;

the number of ice temperature boxes 155 is 4, when the first ice temperature box 155 corresponds to the second conveyor mesh belt 140, the second ice temperature box 155 corresponds to cleaning nozzle 170, the third ice temperature box 155 corresponds to the third conveyor mesh belt 160, and the fourth ice temperature box 155 is used for ice temperature;

the back end of the third conveyor mesh belt 160 corresponds to a bag packaging machine.

impregnation device 110 is used for low-temperature impregnation of meat, meat is transferred into impregnation tank 130 through feed section 121, downhill section 122, impregnation section 123, uphill section 124, and discharge section 125 for impregnation, due to the role of baffles 126, meat can be transferred out from impregnation tank 130. The second conveyor mesh belt 140 is used for transition, which has the effect of draining water, the impregnated meat may also have water drops, therefore, water collecting tank 141 below the second conveyor mesh belt 140 can collect the water drops. Ice temperature device 150 is used for ice temperature, it performs meat loading, ice temperature, meat unloading, and cleaning in turn through the circulation rotation of four ice temperature boxes 155, it is very convenient. In this way, meat is first impregnated at a low temperature, and then the ice temperature can broaden the ice temperature of meat so that meat is easier to keep fresh at the ice temperature. Moreover, the ultrasonic generator and electrostatic plate 180 in ice temperature box 155 can combine ultrasound and electric field to further broaden the ice temperature, so that the ice temperature of meat is easier to achieve.

In ice temperature device 150, the setting of moving plates 153 can adjust the position of conveyor belts 156, so that conveyor belts 156 can be close to the second conveyor mesh belt 140, so that meat can be easily transmitted to conveyor belts 156, and conveyor belts 156 can move away from the second conveyor mesh belt 140 so that the rotation of ice temperature boxes 155 will not be blocked by the second conveyor mesh belt 140. The setting of two first linear actuators 154 enables ice temperature boxes 155 to move up and down. In this way, conveyor belts 156 can be aligned with the second conveyor mesh belt 140, so that the second conveyor mesh belt 140 can transmit meat to different conveyor belts 156, which is very convenient.

The second motor 159 can drive box door 158 to rotate, which realizes the automatic opening and closing of box door 158, and the door has better air tightness. The third conveyor mesh belt 160 is used to transfer meat with good ice temperature out. After the meat is transferred out, vacuum packaging is carried out, and further ice temperature preservation is carried out after packaging. Cleaning nozzle 170 is used to clean ice temperature boxes 155, and the remaining debris is cleaned, after the cleaning is completed, ice temperature boxes 155 can be treated as in an anhydrous state, but anhydrous is not a mandatory requirement, the boxes should contain little water as possible, the bottom surface of ice temperature box 155 can be tilted to make the water flow out.

The freezing point regulator and ice cubes are added to the impregnating solution in impregnation tank 130 so that impregnation tank 130 always maintains a low temperature. Of course, the temperature of the workshop should also be maintained at a lower temperature.

There is moving block 1531 under moving plate 153, and moving block 1531 is connected to the second linear actuator 1532, the second linear actuator 1532 is installed in spinning disk 152.

The first linear actuator 154 comprises body 201, body 201 is equipped with installation cavity 202, installation cavity 202 is equipped with screw 203, screw 203 is sleeved with screw nut 204, screw nut 204 is connected to connecting block 205, one side of installation cavity 202 is provided with strip hole 206, connecting block 205 is movably stuck in strip hole 206, and one end of connecting block 205 is connected to ice temperature box 155; screw 203 is driven by third motor 207, and the third motor 207 is installed on the top of body 201, the structure of the second linear actuator 1532 is the same as that of the first linear actuator 154.

The third motor 207 drives screw 203 to rotate so that screw nut 204 tends to rotate. However, connecting block 205 connected to screw nut 204 is blocked by strip hole 206. Therefore, screw nut 204 performs a linear motion, and connecting block 205 moves linearly in strip hole 206, so ice temperature boxes 155 can move up and down.

The first motor 157 is installed on the outer wall of ice temperature box 155, and the second motor 159 is installed on the top surface of ice temperature box 155.

Ice temperature boxes 155 are cooled by a $CO_2/NH_3$ cascade refrigeration system. The $CO_2/NH_3$ cascade refrigeration system can refer to a patent with the public number CN204648736U.

Cleaning nozzle 170 is installed on the third linear actuator 171, the third linear actuator 171 enables cleaning nozzle 170 to move up and down, and there is water collection tank 172 under cleaning nozzle 170.

Cleaning nozzle 170 can move up and down under the drive of the third linear actuator 171, so that ice temperature boxes 155 can be fully sprayed, and the flowing water will flow to water collection tank 172.

Through holes are arranged on the conveyor belts 156.
The setting of the through holes facilitate the flow of water.

The bottom of moving plate 153 is provided with balls 1533, and the bottoms of balls 1533 are attached to the top surface of spinning disk 152. The setting of balls 1533 facilitates the movement of moving plate 153 and has better stability.

The embodiment also provides a meat preservation method allowed to broaden an ice temperature, which adopts the above-mentioned meat preservation apparatus allowed to broaden an ice temperature, comprising the following steps:

1. Meat is transmitted to impregnation device 110, and then the meat is transmitted to the second conveyor mesh belt 140 after the meat is immersed in the impregnating solution in impregnation tank 130.

2. Meat is transmitted to conveyor belt 156 in the first ice temperature box 155 after the meat is drained on the second conveyor mesh belt 140.

3. when the first group of conveyor belts 156 is full of meat, the heights are adjusted by the first linear actuator 154 so that the second group of conveyor belts 156 and the second conveyor mesh belt 140 are filled accordingly, proceeding until all conveyor belts 156 are filled with meat.

4. After the conveyor belts are filled with meat, the moving plates 153 move inward so that the first ice temperature box 155 moves back, that is, the second conveyor mesh belt 140 moves away from the first ice temperature box 155; and then spinning disk 152 rotates for an angle of 90° so that the second ice temperature box 155 is corresponded to the second conveyor mesh belt 140, the second ice temperature box 155 moves outward through moving plate 153 so that the second conveyor mesh belt 140 is close to corresponding conveyor belt 156; door 158 is closed on the first ice temperature box 155 automatically, when the rotation is completed during a rotation of the spinning disk, the refrigeration system, ultrasonic generator and electrostatic plate 180 in the first ice temperature box start to work, and an ice temperature is carried out to keep meat fresh.

5. When meat in the second ice temperature box 155 is filled and the ice temperature of meat in the first ice temperature box 155 is completed, the spinning disk rotates for an angle of 90°, and the third ice temperature box 155 corresponds to the second conveyor mesh belt 140 and the first ice temperature box 155 corresponds to the third conveyor mesh belt 160 are filled with meat, and the second ice temperature box 155 performs the ice temperature.

6. When all ice temperature boxes 155 finish the above operation, and the ice temperature boxes rotate for an angle of 90°, at this time, the cleaning operation is performed when the first ice temperature box 155 is corresponded to cleaning nozzle 170, thus when ice temperature boxes 155 rotate every time in an angle of 90°, the operations of meat loading, ice temperature, meat unloading, and cleaning are performed in circulation in ice temperature boxes 155.

7. Meat is transferred to the bag packaging machine through the third conveyor mesh belt 160 for packaging, and then the packaged meat is transferred to a fresh-keeping warehouse for further preservation.

Whenever ice temperature box 155 is going to correspond to the second conveyor mesh belt 140, the first linear actuator 154 first adjusts the height so that the top conveyor belt 156 corresponds to the second conveyor mesh belt 140.

This method can immerse meat easily and automatically at low temperatures first, and then carry out ice temperature by ultrasonic and electric field, which can effectively broaden the ice temperature and facilitate the preservation of meat; moreover, the invention can perform operations of meat loading, ice temperature, meat unloading and cleaning in circulation in the process of ice temperature, which is very convenient.

The above content shows a schematic description of the invention and its embodiment, the description is not restrictive, the attached figures only belong to one of the embodiments of the invention, and the actual structure is not limited to the above content. Therefore, if the ordinary technical personnel in this field are inspired by this embodiment, without deviating from the purpose of the invention, the structural mode and other embodiments which are not creatively designed and are similar to the technical solution should belong to the protection scope of the invention.

What is claimed is:

1. A meat preservation apparatus allowed to broaden an ice temperature comprising an impregnation device, wherein the impregnation device comprises a first conveyor mesh belt, the first conveyor mesh belt is vertically equipped with baffles, the first conveyor mesh belt comprises a feed section, a downhill section, an impregnation section, an uphill section and a discharge section, the impregnation section is located in an impregnation tank and a water level of the impregnation tank is lower than a height of the baffles;

a right end of the discharge section is equipped with a second conveyor mesh belt, and a water collecting tank is arranged below the second conveyor mesh belt;

a right end of the second conveyor mesh belt is equipped with an ice temperature device, the ice temperature device comprises a base, a spinning disk is arranged above the base, and four moving plates that can move inside and outside are evenly arranged above the spinning disk, two first linear actuators are vertically arranged above each moving plate, an ice temperature box can move up and down between the two first linear actuators, conveyor belts are arranged in the ice temperature box, and the conveyor belts are driven by a first motor, a box door is set on an outside of the ice temperature box, the box door is driven by a second motor; the ice temperature box is equipped with a refrigeration system, an ultrasonic generator and an electrostatic plate;

a number of ice temperature boxes is four, when a first ice temperature box corresponds to the second conveyor mesh belt, a second ice temperature box corresponds to a cleaning nozzle, a third ice temperature box corresponds to a third conveyor mesh belt, and a fourth ice temperature box is configured for ice temperature;

a back end of the third conveyor mesh belt corresponds to a bag packaging machine.

2. The meat preservation apparatus allowed to broaden the ice temperature according to claim 1, wherein a moving block is under the moving plate, and the moving block is connected to a second linear actuator, and the second linear actuator is installed inside the spinning disk.

3. The meat preservation apparatus allowed to broaden the ice temperature according to claim 2, wherein the first linear actuator comprises a body, the body is equipped with an installation cavity, the installation cavity is equipped with a screw, the screw is sleeved with a screw nut, the screw nut is connected to a connecting block, one side of the installation cavity is provided with a strip hole, the connecting block is movably stuck in the strip hole, and one end of the connecting block is connected to the ice temperature box; the screw is driven by a third motor, and the third motor is installed on a top of the body, a structure of the second linear actuator is the same as that of the first linear actuator.

4. The meat preservation apparatus allowed to broaden the ice temperature according to claim 3, wherein the first motor is installed on an outer wall of the ice temperature box and the second motor is installed on a top surface of the ice temperature box.

5. The meat preservation apparatus allowed to broaden the ice temperature according to claim 4, wherein the ice temperature box is cooled by a $CO_2/NH_3$ cascade refrigeration system.

6. The meat preservation apparatus allowed to broaden the ice temperature according to claim 5, wherein a cleaning nozzle is installed on a third linear actuator, the third linear actuator enables the cleaning nozzle to move up and down, and there is a water collection tank under the cleaning nozzle.

7. The meat preservation apparatus allowed to broaden the ice temperature according to claim 6, wherein through holes are arranged on the conveyor belts.

8. The meat preservation apparatus allowed to broaden the ice temperature according to claim 7, wherein a bottom of the moving plate is provided with balls, and the bottoms of the balls are attached to a top surface of the spinning disk.

9. A meat preservation method allowed to broaden the ice temperature, which adopts the meat preservation apparatus allowed to broaden the ice temperature according to claim 1, wherein the meat preservation method comprises the following steps:

1) transmitting meat to the impregnation device, and then transmitting the meat to the second conveyor mesh belt after the meat is immersed in an impregnating solution in the impregnation tank;

2) transmitting the meat to the conveyor belt in the first ice temperature box after the meat is drained on the second conveyor mesh belt;

3) when a first group of conveyor belts is full of the meat, adjusting heights by the first linear actuator so that a second group of conveyor belts and the second conveyor mesh belt are filled accordingly, proceeding until all conveyor belts are filled with the meat;

4) after the conveyor belts are filled with the meat, moving the moving plates inward so that the first ice temperature box moves back, that is, moving the second conveyor mesh belt away from the first ice temperature box; and then rotating the spinning disk for an angle of 90° so that the second ice temperature box is corresponded to the second conveyor mesh belt, moving the second ice temperature box outward through the moving plate so that the second conveyor mesh belt is close to the corresponding conveyor belt; closing a door on the first ice temperature box automatically, when the rotation is completed during a rotation of the spinning disk, starting the refrigeration system, the ultrasonic generator, and the electrostatic plate in the first ice temperature box to work, and carrying out an ice temperature to keep the meat fresh;

5) when the meat in the second ice temperature box is filled and the ice temperature of meat in the first ice temperature box is completed, rotating the spinning disk for the angle of 90°, filling the third ice temperature box corresponds to the second conveyor mesh belt and the first ice temperature box corresponds to the third conveyor mesh belt with meat, and performing ice temperature by the second ice temperature box;

6) when all the ice temperature boxes finish the above operation and the ice temperature boxes rotate for the angle of 90°, at this time, performing a cleaning operation when the first ice temperature box corresponds to the cleaning nozzle, thus when the ice temperature boxes rotate every time in a 90°, performing operations of meat loading, ice temperature, meat unloading and cleaning in circulation in the ice temperature boxes;

7) transferring the meat to the bag packaging machine through the third conveyor mesh belt for packaging, and then transferring the packaged meat to a fresh-keeping warehouse for a further preservation.

10. The meat preservation method allowed to broaden the ice temperature according to claim 9, wherein whenever the ice temperature box is going to corresponds to the second conveyor mesh belt, adjusting a height of the first linear actuator first so that a top conveyor mesh belt corresponds to the second conveyor mesh belt.

11. The meat preservation method according to claim 9, wherein in the meat preservation apparatus, a moving block is under the moving plate, and the moving block is connected to a second linear actuator, and the second linear actuator is installed inside the spinning disk.

12. The meat preservation method according to claim 11, wherein in the meat preservation apparatus, the first linear actuator comprises a body, the body is equipped with an installation cavity, the installation cavity is equipped with a screw, the screw is sleeved with a screw nut, the screw nut is connected to a connecting block, one side of the installation cavity is provided with a strip hole, the connecting block is movably stuck in the strip hole, and one end of the connecting block is connected to the ice temperature box; the screw is driven by a third motor, and the third motor is installed on a top of the body, a structure of the second linear actuator is the same as that of the first linear actuator.

13. The meat preservation method according to claim 12, wherein in the meat preservation apparatus, the first motor is installed on an outer wall of the ice temperature box and the second motor is installed on a top surface of the ice temperature box.

14. The meat preservation method according to claim 13, wherein in the meat preservation apparatus, the ice temperature box is cooled by a $CO_2/NH_3$ cascade refrigeration system.

15. The meat preservation method according to claim 14, wherein in the meat preservation apparatus, the cleaning nozzle is installed on a third linear actuator, the third linear actuator enables the cleaning nozzle to move up and down, and there is a water collection tank under the cleaning nozzle.

16. The meat preservation method according to claim 15, wherein in the meat preservation apparatus, through holes are arranged on the conveyor belts.

17. The meat preservation method according to claim 16, wherein in the meat preservation apparatus, a bottom of the moving plate is provided with balls, and the bottoms of the balls are attached to a top surface of the spinning disk.

* * * * *